May 5, 1959     E. K. HANSEN     2,885,191
MIXING AND UNLOADING DEVICE
Filed Dec. 3, 1956     2 Sheets-Sheet 1
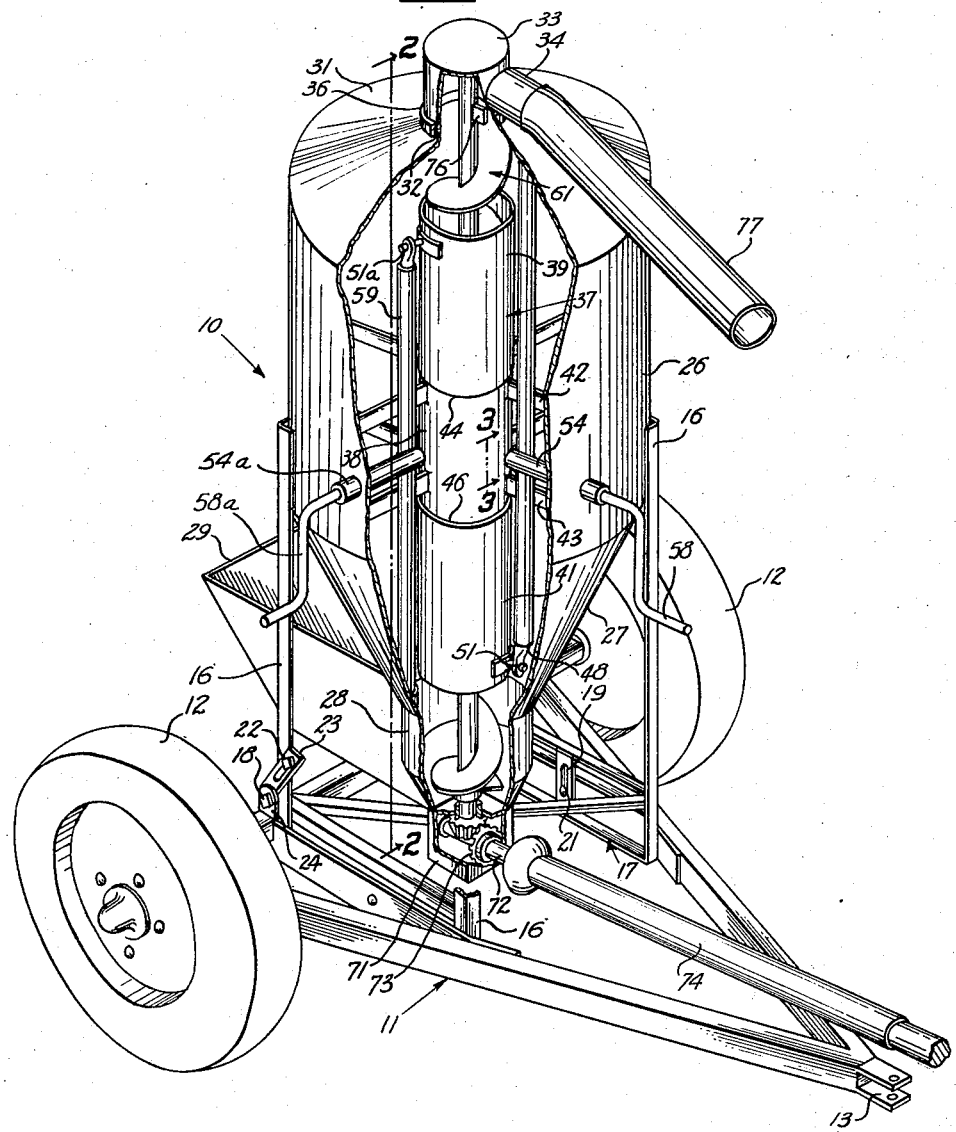
INVENTOR.
ELMER K. HANSEN
BY Rudolph L. Lowell
ATTORNEY.

May 5, 1959
E. K. HANSEN
2,885,191
MIXING AND UNLOADING DEVICE
Filed Dec. 3, 1956
2 Sheets-Sheet 2
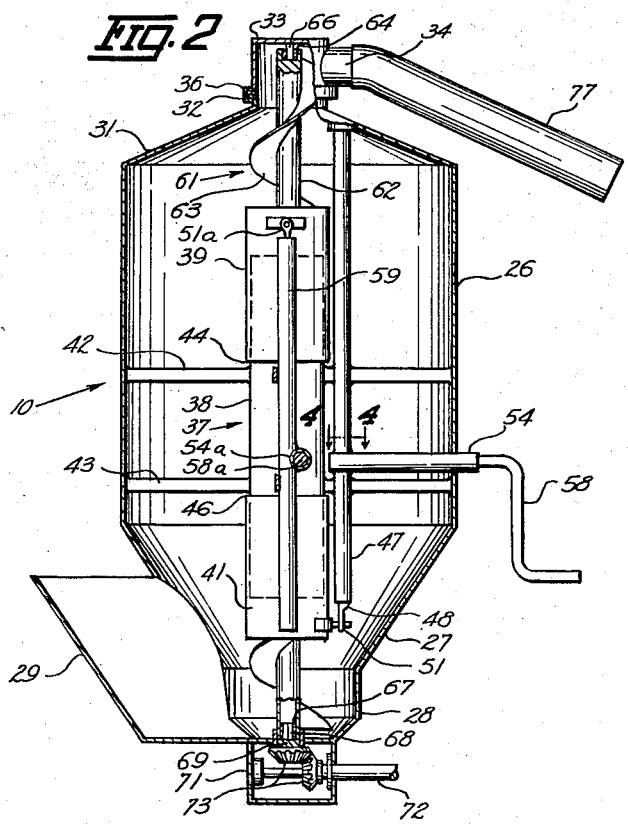
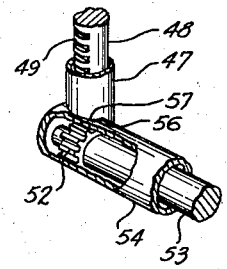
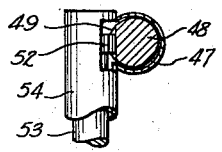
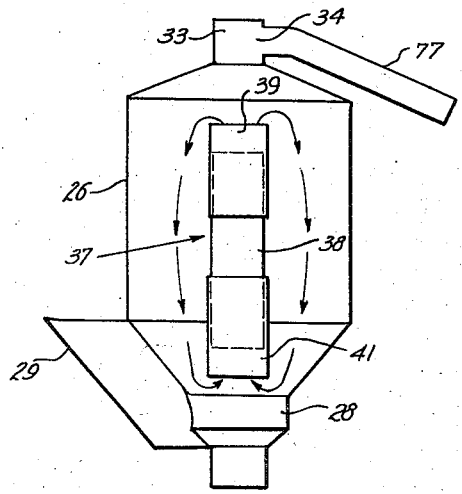
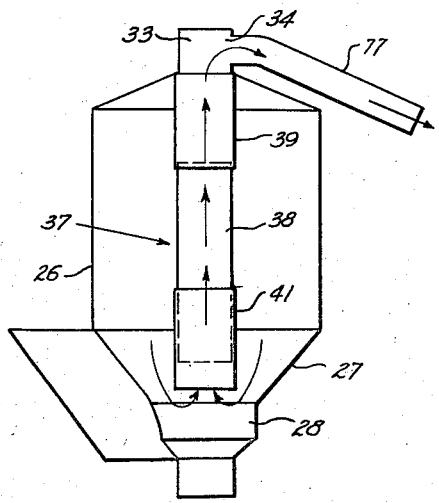
INVENTOR.
ELMER K. HANSEN
BY
ATTORNEY.

United States Patent Office 2,885,191
Patented May 5, 1959

2,885,191

MIXING AND UNLOADING DEVICE

Elmer K. Hansen, Sioux City, Iowa

Application December 3, 1956, Serial No. 625,829

3 Claims. (Cl. 259—8)

This invention relates generally to grain mixing and unloading devices and in particular to a portable tractor operated feed mixing and unloading device.

An object of this invention is to provide an improved feed mixing and unloading device.

A further object of this invention is to provide a feed mixing and unloading device wherein feed to be mixed may be introduced into a hopper for mixing while in transport and then loaded into a feed bunker in a mixed condition.

Still another object of this invention is to provide a feed mixing and unloading device wherein the mixing and unloading operations are accomplished by simply varying the length of a housing or casing assembly for a rotatable spiral auger which is centrally located within a feed hopper.

A further object of this invention is to provide a feed mixing and unloading device which is of a simple and compact construction, adapted to be attached to and operated from a farm tractor and capable of mixing or unloading feed without requiring any appreciable time or effort in the selection of such operation.

Further objects, features and advantages of this invention will become apparent from the following description when taken in connection with the accompanying drawing in which:

Fig. 1 is a perspective view of the material mixing and unloading device of this invention, with some parts being broken away and other parts shown in section to more clearly show its construction;

Fig. 2 is a reduced longitudinal sectional view as seen substantially along the line 2—2 in Fig. 1 and showing the auger and hopper assembly;

Fig. 3 is a perspective detail view of a gear and rack assembly for operating an extensible auger casing which forms a part of the mixing and unloading device of this invention;

Fig. 4 is an enlarged sectional view taken along the line 4—4 in Fig. 2; and

Figs. 5 and 6 are diagramatic illustrations of the device of this invention showing the extensible auger casing in changed positions.

With reference to the drawing the feeding and unloading device of this invention, indicated generally as 10 in Fig. 1, is illustrated in assembly relation with a portable frame 11 of a generally V-shape provided with rear ground wheels 12 and having a hitch connection 13 at its apex or front end for attachment with a usual tractor draw bar (not shown). The device 10 is supported on four upright corner posts 16 which form part of a frame structure 17 that is pivotally supported, as indicated at 18, on the rear end of the portable frame 11 for pivoted adjustable movement relative to the frame 11.

The pivoted movement of the frame structure 17 is guided by the provision of upright slots 19, formed in the frame structure 17 and adapted to guidably receive pins 21 carried on the portable frame 11, with each slot and pin assembly 19, 21 being arranged at transversely opposite sides of the frame 11 at positions forwardly of the pivot connections 18. An adjusted position of the frame structure 17 is retained by lock nut assemblies 22 carried on the rear ones of the upright posts 16 and extended through slotted extensions 23 for the bearings 24 of the pivots 18. By virtue of this adjustment of the frame structure 17 relative to the portable frame 11, the device 10 can be adjusted to a substantially upright position to accommodate variations in the height or level of the hitch connection 13 as determined by its attached position with a tractor draw bar.

The device 10 (Figs. 1 and 2) includes a hopper 26, illustrated as being of a generally cylindrical shape and formed with a downwardly tapered lower section 27 which terminates in a cylindrical section 28 of a reduced diameter relative to the main body of the hopper 26. A material receiving chute 29 projects outwardly from one side of the hopper 10 and opens into the tapered lower sections 27 of the hopper.

The top wall 31 of the hopper 10 terminates in an upright circular flange 32 upon which is rotatably carried a cap 33 that has formed, in one side, a discharge outlet 34. The cap 33 is retained in assembly relation with the flange 32 by a usual split ring structure indicated at 36.

Positioned within the hopper 26, and extended axially thereof in a concentrically spaced relation, is an extensible and contractible auger housing, designated generally as 37 (Figs. 1 and 2), and comprising a fixed center section 38 and movable top and bottom sections 39 and 41, respectively. The center section 38 is held in a supported position within the hopper 26 by two sets of brace members 42 and 43, connected to and extended between the hopper side wall and the center section 38, and with the brace members 43 being vertically spaced below corresponding brace members 42. Each auger housing section 39 and 41 is of slightly larger diameter than the center section 38 and is arranged in a telescoping relation about the corresponding upper and lower ends, respectively, of the center section 38.

Downward movement of the upper auger housing section 39 is limited by the engagement of its lower end 44 with the upper brace members 42. Upward movement of the lower auger housing section 41 is limited by the engagement of its upper end 46 with the lower brace members 43.

A telescopic movement of the lower auger housing section 41 relative to the fixed center housing section 38 is accomplished by means which includes an upright tubular guide member 47 extended axially of the housing assembly 37 and along one side thereof. The tubular member 47 is secured, as by welding, to corresponding vertically spaced brace members 42 and 43 and has its upper end terminating at the hopper top wall 31. Slidably movable within the tubular member 47 is a gear rack 48 (Figs. 2 and 3) having teeth 49 formed along one of its sides. The lower end of the gear rack 48 protrudes outwardly from the tubular member 47 and is attached, as indicated at 51, to the side wall of the lower casing section 41.

The rack 48 has the teeth 49 thereof in meshing engagement with a pinion gear 52 (Figs. 3 and 4) which is mounted on a shaft 53 rotatably supported in a tubular bearing member 54 that is arranged at right angles or perpendicular to the tubular member 47. That portion of the tubular member 54 which surrounds the gear 52 is cut away as indicated at 56 for mating assembly with a similar cut away portion 57 formed in the tubular member 47 opposite the gear teeth 49 to provide for a meshing engagement of the gear 52 with the gear teeth 49. The contiguous edges of the cut away portions 56 and 57 are secured together as by welding.

As best appears in Fig. 2, the bearing member 54, from its welded securement with the tubular member 47, extends transversely across and projects outwardly from the hopper 26. Likewise, the shaft 53, for the gear 52, extends outwardly from the projected end of the bearing member 54 and terminates in a hand crank 58. Thus, on manipulation of the crank 58, to rotate the gear 52, the gear rack 48 is moved relative to the tubular member 47 to in turn provide for an upward or downward movement of the lower auger housing 41.

Movement of the upper auger housing section 39 is similarly accomplished by the provision of a tubular member 59 arranged to one side of the auger housing structure 37 at a position of about ninety degrees from the tubular member 47 and is secured, by welding, to corresponding vertically spaced brace members 42 and 43. The gear and rack assembly for moving the upper auger housing section 39 is similar in all respects to that previously described in connection with the lower auger housing section 41 so that a further description thereof is believed to be unnecessary. Like structure, therefore, for moving the upper auger housing casing 39 is indicated by the same numerals as were used in describing the structure in the means for moving the lower auger housing section 41, with the addition of the suffix a.

An auger 61 (Fig. 2) arranged in operative association within the housing 37 includes a tubular shaft 62 having an axially extended spiral flight or blade 63. The upper end of the shaft 62 carries a bearing insert 64 for receiving a stub axle 66 (Fig. 2) which is mounted on and projects downwardly from the cap member 33. The lower end of the auger shaft 62 carries a socket or female coupler member 67 which is formed with a central opening of a square shape in transverse cross section for receiving a corresponding male coupler member 68 formed as part of a driven shaft 69 that is rotatably supported in a gear casing 71 mounted on and below the hopper section 28. The shaft 69 is driven from a drive shaft 72 through bevel gears 73. Power to the drive shaft 72 is taken from a tractor power take off (not shown) which is suitably connected with the shaft 72 as by a usual telescopic shaft unit designated at 74 in Fig. 1.

In the operation of the device of this invention assume that it is to be used for mixing a feed. The auger housing sections 39 and 41, by manipulation of their corresponding hand cranks 58a and 58 are moved to their relative positions illustrated in Fig. 5, in which the upper auger housing section 39 is spaced downwardly from the top wall 31 of the hopper 26 and the lower end of the auger housing section 41 is spaced above the cylindrical section 28 of the hopper 26. With the auger set into operation, the grain, feed supplements or materials to be mixed are introduced into the chute 29 and fall into the lower hopper section 28 where they are picked up by the auger blade 63 and moved upwardly through the auger housing sections 41, 38 and 39. On reaching the upper end of the auger housing 37 the material drops downwardly into the hopper for again being picked up by the auger blade 63, with this cycle of movement of the grain within the hopper being indicated by the arrows in Fig. 5.

When the mixed feed is to be discharged from the hopper the crank 58a is manipulated so as to move the auger housing section 39 against the top wall 31 of the hopper 26 as shown in Fig. 6. As a result, material picked up by the lower end of the auger blade 63 is moved upwardly through the auger housing 37 and into the cap 33 for discharge through the outlet 34, with this movement of the material being shown by the arrows in Fig. 6. As shown in Fig. 1 the movement of the feed through the outlet 34 is facilitated by what might be called a paddle blade 76 which is secured to and extends radially of the auger shaft 62 at a position substantially opposite the outlet 34. In order to directly unload material into a feed bunker or bin, the outlet is provided with a chute extension 77. Since the cap 33 is rotatably supported on the top wall of the hopper 26 it is apparent that the chute 77 may be directed in any direction through a three hundred and sixty degree rotation of the cap 33.

It is to be noted, in an unloading operation, that as the hopper 26 becomes empty, the auger housing section 41 is to be progressively lowered within the hopper section 28 in order to remove substantially all of the material from the hopper 26. In this connection, it will be apparent that as the auger casing is lowered within the hopper section 28, the rate of discharge of material from the hopper will be decreased.

It is seen, therefore, that a mixing or unloading operation is quickly and easily obtained by merely manipulating the cranks 58 and 58a to move the auger sections 39 and 41 relative to the fixed auger section 38.

Although the invention has been described with respect to a preferred embodiment thereof it is to be understood that it is not to be so limited since changes can be made therein which are within the full intended scope of this invention as defined by the appended claims.

I claim:

1. In a feed mixing and unloading device including a hopper having a feed receiving opening and an inwardly and downwardly inclined bottom portion, an upright rotatable auger centrally arranged within said hopper and coextensive in length with said hopper, said hopper having a feed outlet opening in operative association with the upper end of said auger to receive feed therefrom, and a housing assembly for said auger having a stationary central section and end sections movably supported on said central section for extensible and contractible movement relative thereto, said end sections, in contracted positions thereof, providing for feed being moved upwardly through said housing assembly for discharge into said hopper from the upper end of said housing assembly to mix the feed within said hopper, and in extended positions thereof wherein one end section is positioned adjacent said outlet opening so as to close off the upper end of said housing assembly from said hopper, providing for the movement of feed by said auger upwardly through said housing assembly for discharge from said hopper through said outlet opening.

2. In a mixing and unloading device including an upright hopper having a material receiving inlet in the side wall thereof, a material discharge outlet in the top wall thereof, and a downwardly and inwardly inclined bottom wall, an upright rotatable feed auger centrally arranged in said hopper and extended between the top and bottom walls thereof, with the upper end of said auger being arranged relative to said discharge outlet to move material therethrough, and an extensible and contractible housing assembly for said auger mounted on said hopper, said assembly, in a contracted position thereof, providing for the opening of opposite end portions of said auger to the interior of said hopper, and in an extended position thereof, providing for the closing off of the upper end of said housing assembly from the interior of said hopper, whereby the movement of material by said auger upwardly within the housing and outwardly from the hopper through said discharge outlet is provided for.

3. A feed mixing and unloading device comprising, a hopper having top, side and bottom walls, a feed receiving opening formed in a side wall, a circular opening formed in said top wall, a cap housing mounted on said top wall above said circular opening and having a discharge outlet formed therein, an upright rotatable auger centrally arranged within said hopper and extended between said cap housing and said bottom wall, a tubular housing assembly for said auger including a fixed central section, an upper section and a lower section telescopically mounted for vertical movement on the respective upper and lower portions of said central section, said upper section having a diameter not less than the diameter of said circular opening, and means operable externally of said hopper connected to each of said movable sections for moving them vertically relative to each other, whereby said upper section is vertically movable into a contacting relation with said top wall portion and also into a substantially registering relation with said circular opening with respect to the respective diameters thereof.

References Cited in the file of this patent

UNITED STATES PATENTS 2,101,490 Bullock et al. _____ Dec. 7, 1937
2,517,456 Wherrett _____ Aug. 1, 1950